United States Patent
Langenfeld (10) Patent No.: US 9,408,344 B1
(45) Date of Patent: Aug. 9, 2016

(54) THREE WHEELED VEHICLE (71) Applicant: Hydro-Gear Limited Partnership, Sullivan, IL (US)

(72) Inventor: Thomas J. Langenfeld, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

(21) Appl. No.: 14/535,664

(22) Filed: Nov. 7, 2014

Related U.S. Application Data (60) Provisional application No. 61/902,108, filed on Nov. 8, 2013, provisional application No. 61/919,423, filed on Dec. 20, 2013.

(51) Int. Cl.
*A01D 34/66* (2006.01)
*A01D 34/81* (2006.01)
*A01B 69/00* (2006.01)
*A01D 43/063* (2006.01)

(52) U.S. Cl.
CPC .............. *A01D 34/66* (2013.01); *A01B 69/007* (2013.01); *A01D 34/667* (2013.01); *A01D 34/81* (2013.01); *A01D 43/063* (2013.01)

(58) Field of Classification Search
CPC ........... A01D 34/00; A01D 2034/6831; A01D 34/863; A01B 69/007
USPC ........ 56/11.9, 17.5, 157, 200, 253, 14.7, 202, 56/203; 180/210, 211, 212
See application file for complete search history.

(56) References Cited

U.S. PATENT DOCUMENTS

| | | | |
|---|---|---|---|
| 665,270 A | 1/1901 | Rumely | |
| 810,881 A | 1/1906 | Pfouts et al. | |
| 849,145 A | 4/1907 | Ledwinka | |
| 2,620,612 A * | 12/1952 | De Eugenio | A01D 34/64 180/210 |
| 2,891,370 A * | 6/1959 | Musgrave | A01D 34/64 180/21 |
| 3,780,504 A | 12/1973 | Haseloff | |
| 4,024,695 A | 5/1977 | Haseloff | |
| 4,335,567 A * | 6/1982 | Comer | A01D 43/063 56/12.7 |
| 4,914,894 A * | 4/1990 | Geiger | A01D 34/63 180/19.1 |

(Continued)

FOREIGN PATENT DOCUMENTS

EP  1180468 A1  2/2002
WO  2012091699 A1  7/2012

OTHER PUBLICATIONS

U.S. Appl. No. 14/577,441, filed Dec. 19, 2014.

*Primary Examiner* — John G Weiss
(74) *Attorney, Agent, or Firm* — Neal, Gerber & Eisenberg LLP (57) ABSTRACT

A three-wheeled mowing vehicle is disclosed. The vehicle has a frame and a prime mover. Two steered wheels, steered by a steering mechanism, are near the front of the vehicle and a single non-steered wheel is near the rear of the vehicle. The vehicle has a deck that houses rotatable cutting blades. Portions of the deck are positioned in front of and adjacent each side of the rear wheel. A first rotatable cutting blade is positioned adjacent a first side of the rear wheel and a second rotatable cutting blade is positioned adjacent the opposite side of the rear wheel. One or more additional cutting blades are positioned in front of the rear wheel.

20 Claims, 5 Drawing Sheets

(56) References Cited

U.S. PATENT DOCUMENTS

| | | | |
|---|---|---|---|
| 5,685,134 A * | 11/1997 | Thornburg | A01D 43/00 56/12.9 |
| 5,823,284 A | 10/1998 | Hoar et al. | |
| 7,918,305 B2 | 4/2011 | Scherbring et al. | |
| 8,091,672 B2 | 1/2012 | Gutsch et al. | |
| 8,882,119 B2 | 11/2014 | Burns, Jr. | |
| 2013/0282212 A1 | 10/2013 | Michael et al. | |
| 2014/0223878 A1* | 8/2014 | Sassone | A01D 34/661 56/320.1 |

\* cited by examiner

THREE WHEELED VEHICLE

CROSS-REFERENCE TO RELATED APPLICATIONS

This application claims the benefit of U.S. Provisional Patent Application No. 61/902,108, filed on Nov. 8, 2013. This application also claims the benefit of U.S. Provisional Patent Application No. 61/919,423, filed on Dec. 20, 2013. The contents of both of these applications are fully incorporated herein by reference.

BACKGROUND OF THE INVENTION

This invention relates to vehicles in general and in particular to lawn and garden tractors. Lawn and garden tractors typically have a frame supporting various components of the vehicle and have a prime mover for powering the vehicle. The prime mover powers and drives two or more wheels of the vehicle. Conventional lawn and garden tractors have four wheels—two front wheels and two rear wheels. Conventional lawn and garden tractors typically have a steering mechanism that steers the two front wheels to alter the direction of vehicle travel. Certain lawn and garden tractors have four steered wheels instead of two to provide a tighter turning radius. However, lawn and garden tractors with four steered wheels are more expensive than lawn and garden tractors with two steered wheels.

Other "zero-turn" lawn and garden tractors control the direction of vehicle travel by altering the speed and direction of rotation of the independently-driven pair of rear wheels, which may be used to allow such vehicles to make small or "zero" radius turns. Such zero-turn radius tractors are typically capable of turning around a center point that is located in line with the axis of rotation of the rear wheels and in between the outer sides of the two rear wheels. These zero-turn tractors typically have a pair of front casters, but in some such vehicles the front wheels are actively steered as well. In other similarly controlled zero-turn vehicles, the front wheels are the independently-driven pair of wheels. Such vehicles may have a pair of steered or non-steered rear wheels, a pair of rear casters or a single rear caster.

Lawn and garden tractors typically have two or more rotatable cutting blades, which are typically driven by the prime mover. The cutting blades are typically housed within a deck. The size and shape of the deck typically approximates the area of the rotational footprint of the cutting blades. In conventional lawn and garden tractors, the deck and the cutting blades are positioned between the set of front wheels and the set of rear wheels. Typical cutting blade configurations have either two or three full size cutting blades positioned adjacent one another across the width of the vehicle to create a cutting path. The width of the cutting path created by the cutting blades is typically similar to or slightly larger than the width of the wheelbase of the vehicle.

Certain lawn and garden tractors also have one or more collectors for collecting clippings created by the cutting blades. In some such lawn and garden tractors, the collector or collectors are attached to the deck such that the motion of the cutting blades propels the clippings into the collector(s). Some such lawn and garden tractors have a side discharge collector that is attached to a side of the deck and extends outward from the vehicle beyond the wheel base of the vehicle. This configuration creates a disadvantage by increasing the width of the vehicle, thereby making it more difficult to navigate around objects or through narrow paths. Side-discharge configurations also have a disadvantage of creating windrows, which are rows of dropped clippings, when the direction of vehicle travel is reversed.

In other such lawn and garden tractors, the collector is mounted rearward of the rear wheels. In tractors in which the deck is positioned between the front and the rear wheels, this rear-mount configuration requires a lengthy collector chute to connect the deck to the collector. The use of a lengthy chute increases the likelihood that the clippings will lose momentum and fall to the ground prior to reaching the collector, or that they will clog the collector chute.

SUMMARY OF THE INVENTION

The present invention teaches a three-wheeled mowing vehicle such as a lawn and garden tractor. The vehicle has a frame and a prime mover. The three wheels of the vehicle are configured so that two steered wheels are near the front of the vehicle and a single non-steered wheel is near the rear of the vehicle. The two steered wheels near the front of vehicle are steered by a steering mechanism. The vehicle has a deck that houses rotatable cutting blades that cut grass. A portion of the deck is positioned in front of the single rear wheel. Other portions of the deck are adjacent each side of the single rear wheel. A first rotatable cutting blade is positioned adjacent a first side of the rear wheel and a second rotatable cutting blade is positioned adjacent the opposite side of the rear wheel. One or more additional cutting blades are positioned in front of the rear wheel.

A vehicle according to the present invention is capable of being steered during a turn such that the center point of the turn is adjacent the deck—and therefore also adjacent one of the cutting blades—thereby allowing the cutting blades to cut along the edge of a small object such as a pole when the vehicle is steered around the pole. Turns around small objects can also be easily and intuitively executed because an operator seated in the vehicle can typically see the center point of the turn, and thus the small object. The use of a single rear wheel is less expensive than dual rear wheels and less expensive than tractors with steered front and rear wheels. Furthermore, this configuration also allows the deck to cut underneath bushes and other overhanging materials because the deck extends outward at a low height from the single rear wheel. By contrast, in conventional mowing vehicles, the deck only extends a short distance outward from the dual rear wheels, which cannot fit under low-hanging objects.

In one embodiment of the present invention, a collector is positioned rearward of the deck and connected to the deck via two collector chutes. In this embodiment, the rearward location of the collector minimizes the width of the collector and provides improved collection of clippings.

In certain embodiments, the steering mechanism is mounted to a steering support frame that is part of the vehicle frame. The steering support frame supports a steering shaft and a steering rack. The steering rack has a sector gear that is rotatably driven by a pinion on the steering shaft. The steering rack in turn rotates a first and second pivot arm, each of which is rotatably mounted on the steering support frame and coupled to the steering rack. The first and second pivot arms cause a first and a second steering arm to rotate, respectively. The first and second steering arms have first and second steered wheels mounted to them, respectively, so that rotation of the first steering arm causes the first steered wheel to be steered and rotation of the second steering arm causes the second steered wheel to be steered.

A better understanding of the invention will be obtained from the following detailed descriptions and accompanying drawings, which set forth illustrative embodiments that are indicative of the various ways in which the principals of the invention may be employed.

DETAILED DESCRIPTION OF THE DRAWINGS

The description that follows describes, illustrates, and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. Additionally, the drawings set forth herein are not necessarily drawn to scale, and in some instances proportions may have been exaggerated to more clearly depict certain features. As stated above, this specification is intended to be taken as a whole and interpreted in accordance with the principles of the invention as taught herein and understood by one of ordinary skill in the art.

Figure 1:
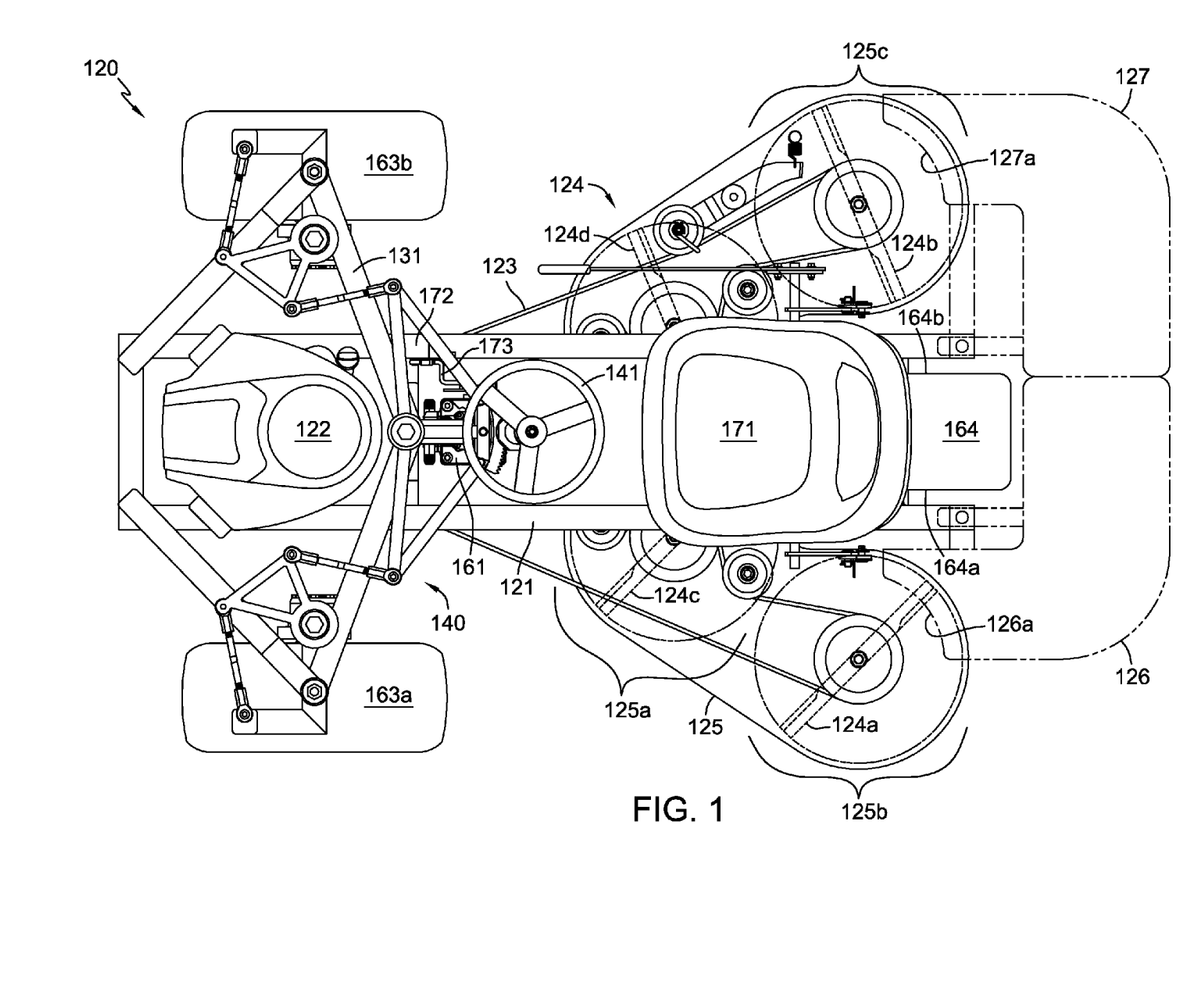
FIG. 1 is a top plan view of an embodiment of a three-wheeled mowing vehicle according to the teaching of the invention with certain components removed for clarity.

FIG. 1 shows a mowing vehicle 120 having two steered front wheels 163a and 163b and a single non-steered rear wheel 164. Rear wheel 164 is rotatably mounted on a rear axle 165 (shown in FIG. 3) approximately along a longitudinal centerline 129 of vehicle 120. Rear wheel 164 has a first side 164a and a second side 164b. Vehicle 120 also has a vehicle frame 121, which supports various components of vehicle 120 as described in further detail below, including seat 171. Vehicle frame 121 includes a steering support frame 131, which supports various components of a steering mechanism 140, which steers front wheels 163a and 163b, as described in further detail below.

Figure 2:
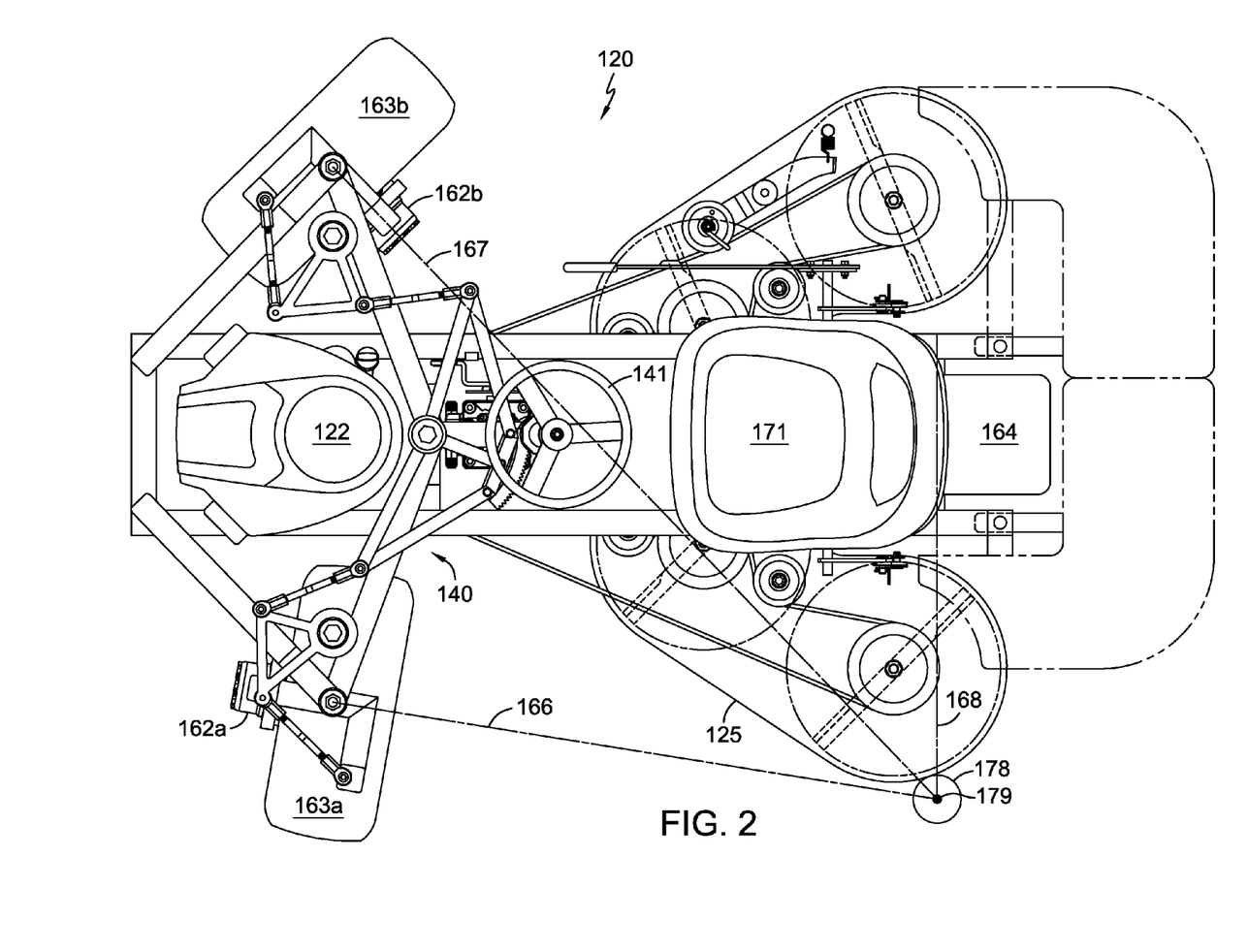
FIG. 2 is a top plan view of the mowing vehicle of FIG. 1 showing the front wheels turned to demonstrate mowing around a small object.

A prime mover 122 is mounted to vehicle frame 121. Prime mover 122 provides power to propel vehicle 120. As shown in FIGS. 1 and 2, prime mover 122 provides power to a pump 161. Pump 161 is in hydraulic communication with and drives wheel motors 162a and 162b. Methods of providing hydraulic communication between one or more pumps and one or more wheel motors of a vehicle are well-known in the art and are therefore not included in the illustrations to simplify the illustrations for better understanding of the invention. An operator provides input to pump 161 via pump input device 172, which is shown in this embodiment as a foot pedal. Pump input device 172 is coupled to pump 161 via pump control linkage 173. Pump input device 172 varies the output of pump 161, which in turn varies the speed of wheel motors 162a and 162b. Pump 161 may utilize a hydraulic differential to vary the speed of wheel motors 162a and 162b independently of one another.

Steered front wheels 163a and 163b, which are located near the front of vehicle 120, are mounted to and driven by wheel motors 162a and 162b, respectively. In this embodiment, wheel motors 162a and 162b are hydraulic geroller-type motors; however, it will be appreciated that other types of motors may be used. While a hydraulic drive system is shown in FIGS. 1 and 2, it will be appreciated by one of ordinary skill in the art that electric drive motors or other suitable drive systems known in the art may be used to drive wheels 163a and 163b. An alternative drive system is shown in U.S. Provisional App. No. 61/919,423, which is incorporated herein by reference. It will also be appreciated by one of skill in the art that rear wheel 164 could be driven by prime mover 122.

Prime mover 122 also drives a belt and pulley system 123 that is coupled to and drives cutting blades 124. As shown in FIG. 1, cutting blades 124 are housed within a deck 125. Deck 125 has a top and sidewall that cover and protect cutting blades 124. When viewed from above, deck 125 has a U-shape. A first portion of the deck 125a, which forms the base of the U-shape, is positioned in front of rear wheel 164. A second portion of the deck 125b and a third portion of the deck 125c extend rearward and adjacent to first and second sides 164a and 164b of rear wheel 164, respectively. A first cutting blade 124a is positioned within deck 125 adjacent rear wheel first side 164a and a second cutting blade 124b is positioned within deck 125 adjacent rear wheel second side 164b, such that axis 168 of rear axle 165 intersects both first cutting blade 124a and second cutting blade 124b. A third cutting blade 124c and a fourth cutting blade 124d are positioned within deck 125 and forward of rear wheel 164. As shown in the embodiment in FIG. 1, cutting blades 124a, 124b, 124c and 124d are generally the same size as one another, and it will be understood that these two blades 124c, 124d could be overlapped. It will be understood that deck 125 may be articulated and/or include supporting wheels or rollers to prevent scalping, as is known in the art. It is contemplated that the position, as illustrated, of certain portions of deck 125 in relation to rear wheel 164 may contribute to the overall stability of vehicle 120, i.e., with deck portions 125b and 125c functioning as vehicle tip-limiters or outriggers.

Additionally, in a similar embodiment of the invention (not shown), deck 125 may be divided into multiple decks, such that each deck portion 125a, 125b, and 125c, for example, is independently supported on vehicle frame 121.

In another similar embodiment of the invention (not shown), each cutting blade 124a, 124b, 124c, and 124d, for example, may be housed within its own separate deck, with each of these decks supported on vehicle frame 121.

In one embodiment, as shown in FIG. 1, a first collector 126 and a second collector 127 are mounted to vehicle 120. Collectors 126 and 127 collect clippings of grass or the like that are cut by cutting blades 124. Collectors 126 and 127 are positioned generally rearward of deck 125, and portions of collectors 126 and 127 are positioned rearward of rear wheel 164. It will be understood that collectors 126 and 127 are optional equipment, collectors 126 and 127 are shown generically, and that portions of collectors 126 and 127 could be positioned above rear wheel 164. A first collector chute 126a connects first collector 126 to deck 125 at second portion of the deck 125b to receive clippings and transfer them to first collector 126. Similarly, a second connector chute 127a connects second collector 127 to deck 125 at third portion of the deck 125c to receive clippings and transfer them to second collector 127. As shown in FIGS. 1 and 2, wherein cutting blades 124 rotate clockwise, collector chutes 126a and 127a may be positioned to the right side of second portion of the deck 125b and third portion of the deck 125c to better align the collector chutes 126a and 127a with the path in which clippings are propelled by cutting blades 124. Although the embodiment depicted shows two separate collectors, it is contemplated that a single collector may be used instead.

FIG. 2 depicts vehicle 120 executing a left turn about a small object 178. As shown in FIG. 2, steered front wheels 163a and 163b are turned at different angles from the forward direction of travel to approximate Ackermann steering. Specifically, steered front wheels 163a and 163b are turned such that axis of rotation 166 of the first steered front wheel 163a and axis of rotation 167 of the second steered front wheel 163b intersect at center or pivot point of the turn 179, which corresponds to the center point of small object 178. As shown in FIG. 2, the edge of deck 125 follows the edge of small object 178, thereby allowing vehicle 120 to trim closely around the edge of small object 178. Thus, vehicle 120 can mow around small object 178 in a single, uninterrupted, constant radius or circumferential turn without requiring an operator of vehicle 120 to make a series of steering adjustments. It should be noted that small object 178 is merely representative of a small object generally and is not the smallest object around which vehicle 120 is capable of mowing. Vehicle 120 is capable of a tighter turn than illustrated in FIG. 2. Specifically, vehicle 120 can approximately mow about a single point located along axis 168 of rear axle 165. Due to this uninterrupted turning capability about a small object, it will be understood by those skilled in the art that vehicle 120, i.e., deck, wheels and steering configuration, is well-suited to electronic, robotic control, as well as human operator control.

Figure 3:
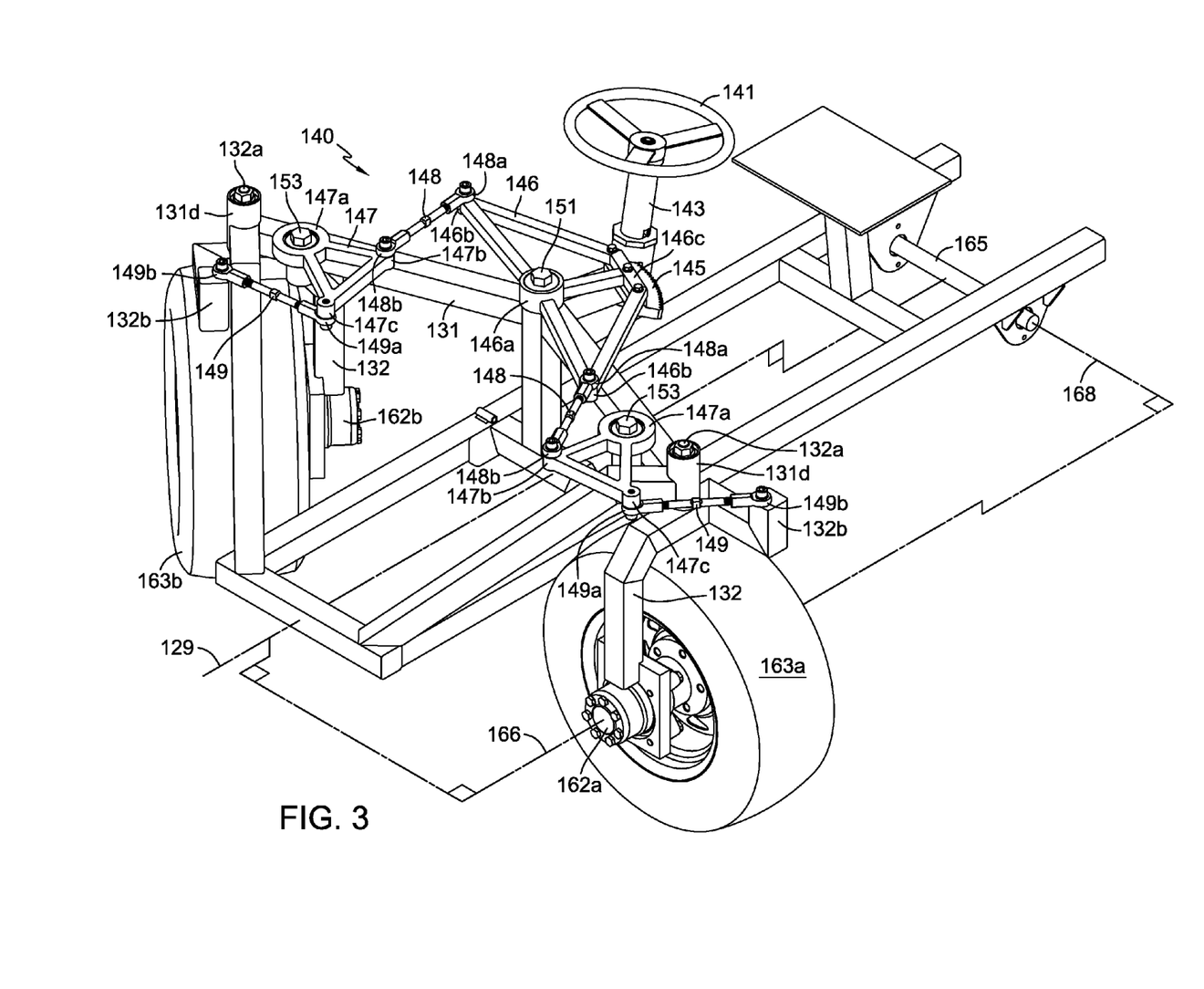
FIG. 3 is a top perspective view of a portion of the mowing vehicle of FIG. 1 including the steering mechanism and the steering support frame.
Figure 4:
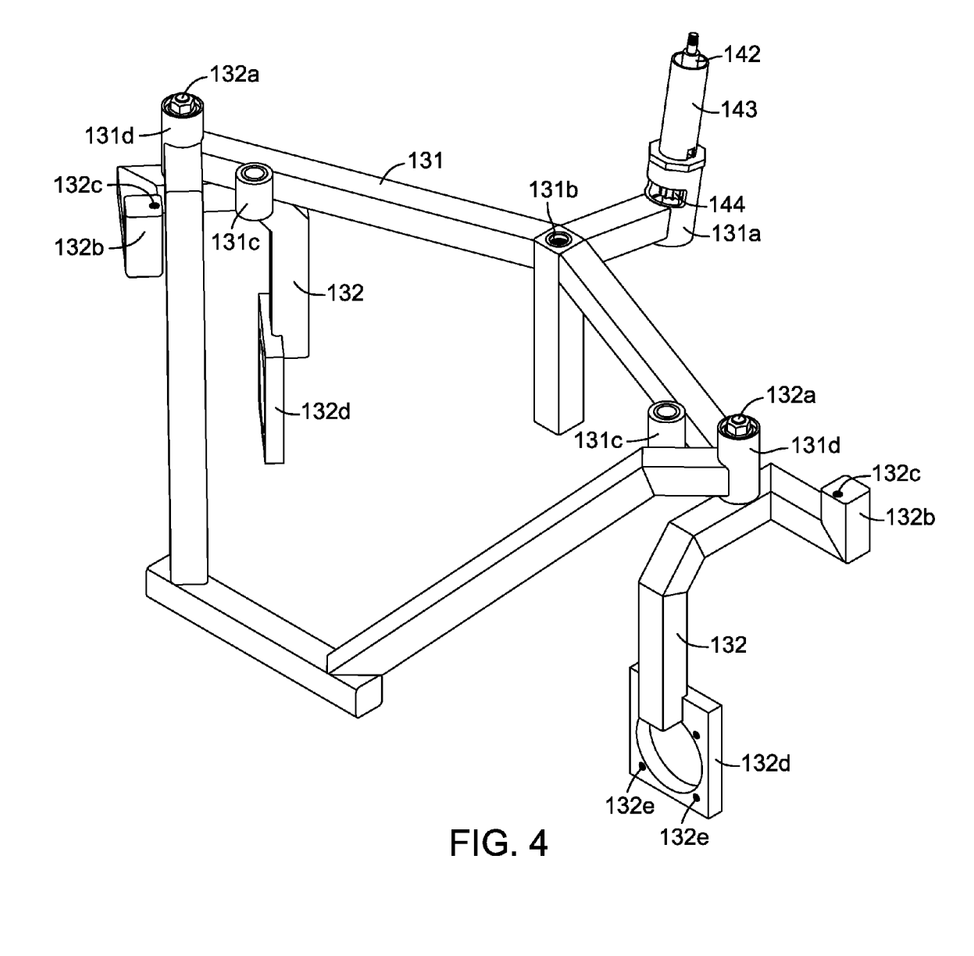
FIG. 4 is a top perspective view of the steering support frame of FIG. 3.

FIGS. 3 and 4 show details of steering support frame 131 and steering mechanism 140. Steering support frame 131 supports and provides mounting locations for multiple components of steering mechanism 140, described in detail below. In particular, steering support frame 131 has a steering column pivot 131a. In this embodiment, steering column pivot 131a is a cylindrical member having a cylindrical opening to receive one or more bearings and other components. Steering column pivot 131a is approximately located along vehicle longitudinal centerline 129. Steering support frame 131 also has a steering rack pivot support 131b that includes a cylindrical opening to receive a pin or fastener. Steering rack pivot support 131b is located along longitudinal centerline 129 of vehicle 120 and forward of steering column pivot 131a. Steering support frame 131 also has a pair of pivot arm pivot supports 131c. Pivot arm pivot supports 131c include cylindrical openings to receive pins or fasteners and are located outboard from longitudinal centerline 129 of vehicle 120. Steering support frame 131 also has a pair of steering arm pivots 131d that include cylindrical openings to receive bearings and pins or fasteners. Steering arm pivots 131d are located outboard from longitudinal centerline 129 of vehicle 120. As described in detail below, steering column pivot 131a, steering rack pivot support 131b, pivot arm pivot supports 131c, and steering arm pivots 131d provide mounting locations for components of steering mechanism 140 to be rotatably mounted to steering support frame 131.

Steering mechanism 140 has a steering input device 141, shown in FIG. 3 as a steering wheel. A plurality of linkages, which are described below, connect steering input device 141 to steered wheels 163a and 163b. Steering input device 141 is mounted to a steering shaft 142 that is rotatably disposed in a sheering shaft housing 143 and rotatably mounted in steering column pivot 131a. Pinion 144 is mounted on steering shaft 142, such that rotation of steering shaft 142 rotates pinion 144.

Steering rack 146 has a sector gear 145 mounted thereto via a sector gear mount 146c. Sector gear 145 meshes with pinion 144 such that rotation of pinion 144 causes rotation of sector gear 145 and thus rotation of steering rack 146. Steering rack 146 has a steering rack collar 146a for receiving a bearing and rotatably mounting steering rack 146 to steering support frame 131 at steering rack pivot support 131b. A steering rack kingpin bolt 151 passes through steering rack collar 146a and into steering rack pivot support 131b, thereby rotatably connecting steering rack 146 to steering support frame 131. Thus, rotation of steering shaft 142 causes rotation of steering rack 146 about steering rack kingpin bolt 151.

A pair of pivot arms 147 are rotatably connected to: (i) steering rack 146 via connectors, shown in this embodiment as tie rods 148; (ii) steering support frame 131 at pivot arm pivot supports 131c; and (iii) steering arms 132 via links 149. With respect to the connection of pivot arms 147 to steering rack 146, each tie rod 148 has a tie rod first pivot 148a on one end of tie rod 148 and a tie rod second pivot 148b on the opposite end of tie rod 148. Tie rod first pivots 148a are rotatably connected to tie rod mounting bosses 146b on steering rack 146. Tie rod second pivots 148b are rotatably connected to pivot arm tie rod mounting bosses 147b on pivot arms 147.

Pivot arms 147 are rotatably mounted to steering support frame 131 at pivot arm pivot supports 131c and pivot arm collars 147a via pivot arm kingpin bolts 153. Kingpin bolts 153 pass through bearings in pivot arm collars 147a and into pivot arm pivot supports 131c. Thus, rotation of steering rack 146 causes pivot arms 147 to rotate about pivot arm kingpin bolts 153.

Pivot arms 147 are also rotatably connected to steering arms 132 via links 149. In particular, each link 149 has a link first pivot 149a on one end of link 149 and a link second pivot 149b on the opposite end of link 149. Each link first pivot 149a is rotatably connected to pivot arm 147 via a link a mounting boss 147c on pivot arm 147. Each link second pivot 149b is rotatably connected to a lever arm 132b on steering arm 132 by a fastener or pin that passes through pivot 149b and into a link attachment opening 132c formed in lever arm 132b.

Steering arms 132 are rotatably mounted on steering support frame 131 at steering arm pivots 131d. In particular, steering arm kingpin bolts 132a rotatably connect each steering arm 132 to steering arm pivots 131d on steering support frame 131. Thus rotation of pivot arms 147 causes rotation of steering arms 132 about steering arm kingpin bolts 132a.

Each steering arm 132 extends downward from a lever arm 132b and connects to a wheel motor mounting flange 132d. Wheel motors 162a and 162b are mounted to wheel motor mounting flanges 132d via bolts passing through wheel motor mounting bolt holes 132e formed in wheel motor mounting flanges 132d and into wheel motors 162a and 162b. Steered wheels 163a and 163b are mounted to wheel motors 162a and 162b, respectively.

Thus, rotation of steering wheel 141 causes rotation of steering rack 146, which in turn rotates pivot arms 147. Rotation of pivot arms 147 causes rotation of steering arms 132, to which steered wheels 163a and 163b are mounted, thereby steering steered wheels 163a and 163b. In the embodiment shown, tie rods 148 and links 149 can be adjusted to affect wheel alignment.

FIG. 3 shows steering mechanism 140 positioned in its maximum left hand turn condition. In this condition, rotational axis 166 of leading steered wheel 163a is oriented parallel to longitudinal centerline 129 of vehicle 120 and perpendicular to axis 168 of rear axle 165 and non-steered wheel 164. When steering mechanism 140 is positioned in its maximum right hand turn condition (not shown), wheel 163b is the leading steered wheel and rotational axis 167 of leading steered wheel 163b is oriented parallel to longitudinal centerline 129 of vehicle 120 and perpendicular to rotational axis 168 of non-steered wheel 164.

Figure 5:
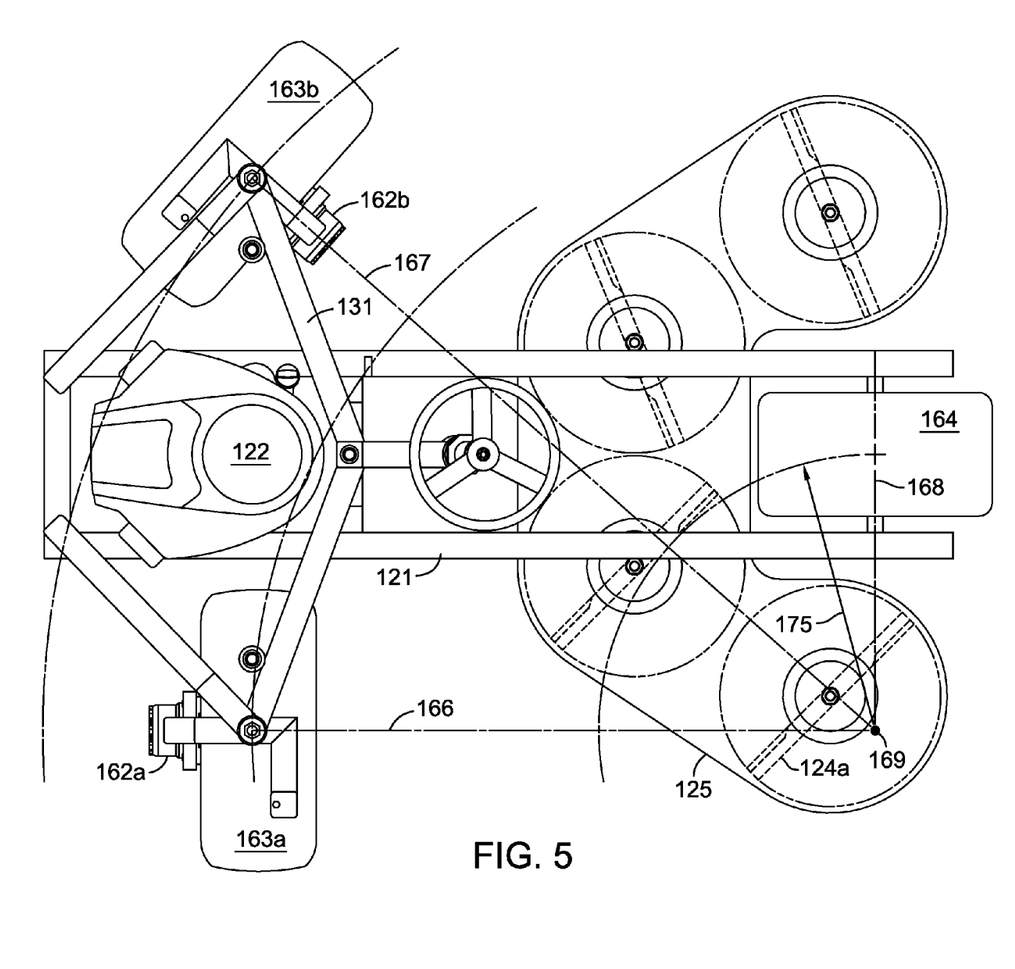
FIG. 5 is a top plan view of a portion of the vehicle of FIG. 1 showing the front wheels turned to demonstrate a turn.

FIG. 5 shows certain portions of vehicle 120 to illustrate vehicle 120 positioned in its maximum left hand turn condition that corresponds with the position of steering mechanism 140 shown in FIG. 3. As shown in FIG. 5, axis of rotation 166 of first steered wheel 163a and axis of rotation 167 of second steered wheel 163b intersect along rotational axis 168 of non-steered rear wheel 164 at pivot point 169. Pivot point 169 is the pivot point of the minimum vehicle turning radius 175, and pivot point 169 is located underneath deck 125 and cutting blade 124a. Therefore, during this turn there will be no uncut portion of grass around the inner radius of the turn. As shown in FIG. 5, rear wheel 164 will follow an arc having radius 175, thereby executing a turn that does not leave uncut grass on the interior of the turn while at the same time minimizing turf or other surface scrubbing by rear non-steered wheel 164.

The geometric relationships described above and shown in FIGS. 3 and 5 are specific to the embodiment shown and are not requirements or limitations of the invention. In other embodiments the leading steered wheel, e.g., wheel 163a in FIG. 5, can be steered to an angle greater than or less than ninety degrees in relation to longitudinal centerline 129 of vehicle 120 and still have the rotational axes of the leading and trailing steered wheels intersect at a point under deck 125.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

I claim:

1. A mowing vehicle comprising:
a vehicle frame having a longitudinal centerline;
a steering mechanism supported by the vehicle frame;
a first steered front wheel engaged to the steering mechanism and a second steered front wheel engaged to the steering mechanism;
a first wheel motor engaged to and powering the first steered front wheel, and a second wheel motor engaged to and powering the second steered front wheel;
a rear axle supported by the vehicle frame rearward of the first and second steered front wheels, the rear axle having an axis;
a single rear wheel mounted on the rear axle along the longitudinal centerline of the vehicle frame, the rear wheel having a first side and a second side; and
a first cutting blade disposed below the vehicle frame and adjacent the first side of the rear wheel, and a second cutting blade disposed below the vehicle frame and adjacent the second side of the rear wheel, whereby the axis of the rear axle intersects both the first cutting blade and the second cutting blade; wherein the first and second steered front wheels are steerable to turn the vehicle such that when the vehicle is turned in either a first direction or a second direction, a vehicle turning center point is in line with the axis of the rear axle and adjacent to the one of the first cutting blade or the second cutting blade.

2. The mowing vehicle of claim 1, further comprising a deck supported by the vehicle frame, wherein the first cutting blade and the second cutting blade are housed in the deck.

3. The mowing vehicle of claim 2, further comprising a first collector coupled to the deck rearward of the first cutting blade.

4. The mowing vehicle of claim 3, further comprising a first collector chute extending rearward from the deck and connecting the deck to the first collector.

5. The mowing vehicle of claim 4, further comprising a second collector coupled to the deck rearward of the second cutting blade, and a second collector chute extending rearward from the deck and connecting the deck to the second collector.

6. The mowing vehicle of claim 2, further comprising a third cutting blade housed in the deck and positioned forward of the first cutting blade, and a fourth cutting blade housed in the deck and positioned forward of the second cutting blade.

7. The mowing vehicle of claim 6, further comprising a prime mover supported on the vehicle frame and a belt system driven by the prime mover and drivingly engaged to the first, second, third, and fourth cutting blades.

8. The mowing vehicle of claim 6, wherein the third and fourth cutting blades are positioned forward of the rear wheel.

9. The mowing vehicle of claim 1, further comprising a steering support frame supported by the vehicle frame and supporting the steering mechanism, and the steering mechanism comprises:
a rotatable steering shaft;
a steering rack rotatably mounted on the steering support frame, the steering rack having a sector gear rotatably driven by the steering shaft;
a first pivot arm and a second pivot arm, each of which is rotatably mounted on the steering support frame and coupled to the steering rack;
a first steering arm rotatably mounted on the steering support frame and coupled to the first pivot arm and to the first steered front wheel; and
a second steering arm rotatably mounted on the steering support frame and coupled to the second pivot arm and to the second steered front wheel,
wherein rotation of the steering shaft rotates the steering rack, which rotates the first and second pivot arms, which in turn rotate the first and second steering arms to turn the first and second steered front wheels, respectively.

10. The mowing vehicle of claim 9, wherein the first wheel motor is mounted on the first steering arm and the second wheel motor is mounted on the second steering arm.

11. The mowing vehicle of claim 10, further comprising a prime mover supported on the vehicle frame and engaged to and driving a pump, wherein the pump is hydraulically connected to the first wheel motor and the second wheel motor.

12. The mowing vehicle of claim 2, further comprising a steering support frame supported by the vehicle frame and supporting the steering mechanism, and the steering mechanism comprises a rotatable steering shaft and a plurality of linkages mounted on the steering support frame, the plurality of linkages connecting the steering shaft to the first steered front wheel and the second steered front wheel such that rotation of the steering shaft turns the first and second steered front wheels.

13. A mowing vehicle comprising:
a vehicle frame having a longitudinal centerline;
a steering mechanism supported by the vehicle frame;
a first steered front wheel engaged to and steerable by the steering mechanism, wherein the first steered front wheel is rotatable about a first axis of rotation;
a second steered front wheel engaged to and steerable by the steering mechanism, wherein the second steered front wheel is rotatable about a second axis of rotation;
a rear axle supported by the vehicle frame rearward of the first and second steered front wheels;
a single rear wheel mounted on the rear axle on the longitudinal centerline of the vehicle frame, the rear wheel being rotatable about a third axis of rotation perpendicular to the longitudinal centerline of the vehicle frame and having a first side and a second side; and
a deck supported by the vehicle frame and housing a plurality of cutting blades, wherein a first portion of the deck is in front of the rear wheel, a second portion of the deck connected to the first portion of the deck is adjacent the first side of the rear wheel, and a third portion of the deck connected to the first portion of the deck is adjacent the second side of the rear wheel, wherein the first and second steered front wheels are steerable to turn the vehicle such that a vehicle turning center point is in line with the third axis of rotation and adjacent to one of the plurality of cutting blades and offset from the longitudinal centerline of the vehicle frame, and the first axis of rotation and the second axis of rotation intersect at the vehicle turning center point, and when the vehicle is at a maximum turn, at least a portion of one of the plurality of cutting blades is located between the vehicle turning center point and the longitudinal centerline of the vehicle frame along the third axis of rotation.

14. The mowing vehicle of claim 13, wherein the plurality of cutting blades comprises a first cutting blade housed in the second portion of the deck, a second cutting blade housed in the third portion of the deck, and a third cutting blade and a fourth cutting blade housed in the first portion of the deck.

15. The mowing vehicle of claim 13, further comprising a first wheel motor engaged to and powering the first steered front wheel, and a second wheel motor engaged to and powering the second steered front wheel.

16. A mowing vehicle, comprising:
a vehicle frame;
a first steered front wheel and a second steered front wheel supported by the vehicle frame;
a first wheel motor engaged to and powering the first steered front wheel, and a second wheel motor engaged to and powering the second steered front wheel;
a steering support frame supported by the vehicle frame;
a steering mechanism supported by the steering support frame and comprising a rotatable steering shaft and a plurality of linkages connecting the steering shaft to the first steered front wheel and the second steered front wheel such that rotation of the steering shaft causes the first and second steered front wheels to turn;
a single rear wheel rotatably mounted on the vehicle and having a first side and a second side; and
a deck supported by the vehicle frame and a plurality of cutting blades housed in the deck, wherein at least one of the plurality of cutting blades is positioned adjacent one of the first side and the second side of the rear wheel.

17. The mowing vehicle of claim 16, wherein the plurality of cutting blades comprises a first cutting blade and a second cutting blade housed in the deck, and the first cutting blade is positioned adjacent the first side of the rear wheel and the second cutting blade is positioned adjacent the second side of the rear wheel.

18. The mowing vehicle of claim 17, further comprising a third cutting blade housed in the deck and positioned forward of the first cutting blade, and a fourth cutting blade housed in the deck and positioned forward of the second cutting blade.

19. The mowing vehicle of claim 17, further comprising a first collector coupled to the deck rearward of the first cutting blade, a first collector chute extending rearward from the deck and connecting the deck to the first collector, a second collector coupled to the deck rearward of the second cutting blade, and a second collector chute extending rearward from the deck and connecting the deck to the second collector.

20. The mowing vehicle of claim 17, wherein the first and second steered front wheels are steerable to turn the vehicle such that when the vehicle is turned in either a first direction or a second direction, a vehicle turning center point is in line with an axis of rotation of the rear wheel and adjacent to the one of the first cutting blade or the second cutting blade.

* * * * *